US012108236B2

(12) United States Patent
Boehm et al.

(10) Patent No.: US 12,108,236 B2
(45) Date of Patent: *Oct. 1, 2024

(54) METHOD AND DEVICE FOR DECODING A HIGHER-ORDER AMBISONICS (HOA) REPRESENTATION OF AN AUDIO SOUNDFIELD

(71) Applicant: Dolby Laboratories Licensing Corporation, San Francisco, CA (US)

(72) Inventors: Johannes Boehm, Göttingen (DE); Florian Keiler, Hannover (DE)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,198

(22) Filed: Jul. 26, 2023

(65) Prior Publication Data

US 2024/0040327 A1 Feb. 1, 2024

Related U.S. Application Data

(63) Continuation of application No. 17/943,965, filed on Sep. 13, 2022, now Pat. No. 11,743,669, which is a (Continued)

(30) Foreign Application Priority Data

Jul. 16, 2012 (EP) .................................... 12305862

(51) Int. Cl.
*H04S 7/00* (2006.01)
*H04S 3/00* (2006.01)

(52) U.S. Cl.
CPC ................ *H04S 7/30* (2013.01); *H04S 3/008* (2013.01); *H04S 2420/11* (2013.01)

(58) Field of Classification Search
CPC ......... H04S 7/30; H04S 3/008; H04S 2420/11
See application file for complete search history.

(56) References Cited

U.S. PATENT DOCUMENTS 9,241,216 B2 1/2016 Keiler
2005/0100171 A1 5/2005 Reilly
(Continued)

FOREIGN PATENT DOCUMENTS

CN 1677493 10/2005
EP 2094032 A1 8/2009
(Continued)

OTHER PUBLICATIONS

Daniel, J., Représentation de champs acoustiques, application à la transmission et à la reproduction de scènes sonores complexes dans un contexte multimédia, Doctorate thesis for Université Paris 6, Jul. 31, 2001, pp. 177-200, 281-282, 311-315.
(Continued)

*Primary Examiner* — David L Ton

(57) ABSTRACT

The invention discloses rendering sound field signals, such as Higher-Order Ambisonics (HOA), for arbitrary loudspeaker setups, where the rendering results in highly improved localization properties and is energy preserving. This is obtained by rendering an audio sound field representation for arbitrary spatial loudspeaker setups and/or by a a decoder that decodes based on a decode matrix (D). The decode matrix (D) is based on smoothing and scaling of a first decode matrix $\hat{D}$ with smoothing coefficients. The first decode matrix $\hat{D}$ is based on a mix matrix G and a mode matrix $\tilde{\psi}$, where the mix matrix G was determined based on L speakers and positions of a spherical modelling grid related to a HOA order N, and the mode matrix $\tilde{\psi}$ was determined based on the spherical modelling grid and the HOA order N.

3 Claims, 7 Drawing Sheets

Related U.S. Application Data continuation of application No. 17/189,067, filed on Mar. 1, 2021, now Pat. No. 11,451,920, which is a continuation of application No. 16/789,077, filed on Feb. 12, 2020, now Pat. No. 10,939,220, which is a continuation of application No. 16/417,515, filed on May 20, 2019, now Pat. No. 10,595,145, which is a continuation of application No. 16/114,937, filed on Aug. 28, 2018, now Pat. No. 10,306,393, which is a continuation of application No. 15/920,849, filed on Mar. 14, 2018, now Pat. No. 10,075,799, which is a continuation of application No. 15/619,935, filed on Jun. 12, 2017, now Pat. No. 9,961,470, which is a continuation of application No. 14/415,561, filed as application No. PCT/EP2013/065034 on Jul. 16, 2013, now Pat. No. 9,712,938.

(56) References Cited

U.S. PATENT DOCUMENTS

| | | | |
|---|---|---|---|
| 2012/0225944 A1 | 9/2012 | Murphy et al. |
| 2012/0259442 A1 | 10/2012 | Jin |
| 2013/0148812 A1 | 6/2013 | Corteel et al. |
| 2013/0216070 A1 | 8/2013 | Keiler et al. |

FOREIGN PATENT DOCUMENTS

| | | |
|---|---|---|
| EP | 2451196 | 5/2012 |
| JP | 2013-517687 | 5/2013 |
| KR | 20060120109 A | 11/2006 |
| KR | 20120102127 A | 9/2012 |
| WO | 98/12896 | 3/1998 |
| WO | 2011090834 A1 | 7/2011 |
| WO | 2011/117399 | 9/2011 |
| WO | 2012/023864 | 2/2012 |

OTHER PUBLICATIONS

"Ambisonic net links equipment for ambisonic production and listening", Sep. 29, 2011, http://www.ambisonic.net/gear.html; 1 page only.

Abhayapala: "Generalized framework for spherical microphone arrays—Spacial and frequency decomposition", Proc. IEEE International Conference on Acoustics, Speech, and Signal Processing, Apr. 2008, pp. 5268-5271.

Batke et al., "Using VBAP-derived panning functions for 3D ambisonics decoding", Proceeding of the 2nd International Symposium on Ambisonics and Spherical Acoustics, May 6, 2010; pp. 1-4.

Boehm et al, "Decoding for 3-D", AES Convention 130, May 2011, New York, pp. 1-16.

Daniel et al "Further investigations of high order ambisonics and wavefield synthesis for holophonic sound imaging", In AES Convention Paper 5788 Presented at the 114th Convention, Mar. 2003. Paper 4795 presented at the 114th Convention; pp. 1-18.

Daniel: "Fondements Theoriques et analysis Preliminaires"; "Representation de champs acoustiques, application a la transmission et a la reproduction de scenes sonores complexes dans un contexte multimedia.", PhD thesis, Universite Paris 6, 2001; Jul. 31, 2001; pp. 1-319.

Driscoll et al "Computing fourier transforms and convolutions on the 2-sphere", Advances in Applied Mathematics, 15: pp. 202-250, 1994.

Fliege et al "A two-stage approach for computing cubature Formulae for the Sphere", Technical report, Fachbereich Mathematik, Universitat Dortmund, 1999; pp. 1-31.

Fliege J "Integration nodes for the sphere", http://www.personal.soton.ac.uk/jf1w07/nodes/nodes.html, Online, accessed Jun. 1, 2012' 1 page only.

Hardin et al "Mclaren's improved snub cube and other new spherical designs in three dimensions", Discrete and Computational Geometry, 15, pp. 429-441, Sep. 11, 1995.

Hardin et al "Spherical Designs Spherical t-Designs", http://www2.research.att.com/.about.njas/sphdesigns/; pp. 1-3, retrieved Jan. 2013.

Poletti et al., "Three dimensional surround sound systems based on apherical harmonics", J. Audio Engineering Society, 53(11), pp. 1004-1025, Nov. 2005.

Pulkki V, "Spatial Sound Generation and Perception by Amplitude Planning Techniques", PhD thesis, Helsinki University of Technology, 2001; pp. 1-59.

Rafaely B "Plane-wave decomposition of the sound field on a shere", J. Acoust. Soc. Am., 4(116), pp. 2149-2157, Oct. 2004.

Williams: "Fourier Acoustics", Academic Press, Jun. 10, 1999, Abstract, pp. 1-5.

Zotter et al "Energy-preserving ambisonic decoding", Acta Acustica united with Acustica, 98(1), pp. 37-47, 2012.

METHOD AND DEVICE FOR DECODING A HIGHER-ORDER AMBISONICS (HOA) REPRESENTATION OF AN AUDIO SOUNDFIELD

CROSS-REFERENCE TO RELATED APPLICATIONS

This application is a continuation of U.S. patent application Ser. No. 17/943,965, filed Sep. 13, 2022, which is a continuation of U.S. patent application Ser. No. 17/189,067, filed Mar. 1, 2021, now U.S. Pat. No. 11,451,920, which is a continuation of U.S. patent application Ser. No. 16/789,077, filed Feb. 12, 2020, now U.S. Pat. No. 10,939,220, which is a continuation of U.S. patent application Ser. No. 16/417,515, filed May 20, 2019, now U.S. Pat. No. 10,595,145, which is a continuation of U.S. patent application Ser. No. 16/114,937, filed Aug. 28, 2018, now U.S. Pat. No. 10,306,393, which is a continuation of U.S. patent application Ser. No. 15/920,849, filed Mar. 14, 2018, now U.S. Pat. No. 10,075,799, which is a continuation of the U.S. patent application Ser. No. 15/619,935, filed Jun. 12, 2017, now U.S. Pat. No. 9,961,470, which is a continuation of U.S. patent application Ser. No. 14/415,561, filed Jan. 16, 2015, now U.S. Pat. No. 9,712,938, which is the U.S. National Stage of the International Application No. PCT/EP2013/065034, filed Jul. 16, 2013, which claims priority to the European Patent Application No. 12305862.0, filed Jul. 16, 2012, each of which is incorporated by reference in its entirety.

FIELD OF THE INVENTION

This invention relates to a method and a device for rendering an audio soundfield representation, and in particular an Ambisonics formatted audio representation, for audio playback.

BACKGROUND

Accurate localization is a key goal for any spatial audio reproduction system. Such reproduction systems are highly applicable for conference systems, games, or other virtual environments that benefit from 3D sound. Sound scenes in 3D can be synthesized or captured as a natural sound field. Soundfield signals such as e.g. Ambisonics carry a representation of a desired sound field. The Ambisonics format is based on spherical harmonic decomposition of the soundfield. While the basic Ambisonics format or B-format uses spherical harmonics of order zero and one, the so-called Higher Order Ambisonics (HOA) uses also further spherical harmonics of at least 2' order. A decoding or rendering process is required to obtain the individual loudspeaker signals from such Ambisonics formatted signals. The spatial arrangement of loudspeakers is referred to as loudspeaker setup herein. However, while known rendering approaches are suitable only for regular loudspeaker setups, arbitrary loudspeaker setups are much more common. If such rendering approaches are applied to arbitrary loudspeaker setups, sound directivity suffers.

SUMMARY OF THE INVENTION

The present invention describes a method for rendering/decoding an audio sound field representation for both regular and non-regular spatial loudspeaker distributions, where the rendering/decoding provides highly improved localization properties and is energy preserving. In particular, the invention provides a new way to obtain the decode matrix for sound field data, e.g. in HOA format. Since the HOA format describes a sound field, which is not directly related to loudspeaker positions, and since loudspeaker signals to be obtained are necessarily in a channel-based audio format, the decoding of HOA signals is always tightly related to rendering the audio signal. Therefore, the present invention relates to both decoding and rendering sound field related audio formats.

One advantage of the present invention is that energy preserving decoding with very good directional properties is achieved. The term "energy preserving" means that the energy within the HOA directive signal is preserved after decoding, so that e.g. a constant amplitude directional spatial sweep will be perceived with constant loudness. The term "good directional properties" refers to the speaker directivity characterized by a directive main lobe and small side lobes, wherein the directivity is increased compared with conventional rendering/decoding.

The invention discloses rendering sound field signals, such as Higher-Order Ambisonics (HOA), for arbitrary loudspeaker setups, where the rendering results in highly improved localization properties and is energy preserving. This is obtained by a new type of decode matrix for sound field data, and a new way to obtain the decode matrix. In a method for rendering an audio sound field representation for arbitrary spatial loudspeaker setups, the decode matrix for the rendering to a given arrangement of target loudspeakers is obtained by steps of obtaining a number of target speakers and their positions, positions of a spherical modeling grid and a HOA order, generating a mix matrix from the positions of the modeling grid and the positions of the speakers, generating a mode matrix from the positions of the spherical modeling grid and the HOA order, calculating a first decode matrix from the mix matrix and the mode matrix, and smoothing and scaling the first decode matrix with smoothing and scaling coefficients to obtain an energy preserving decode matrix.

In one embodiment, the invention relates to a method for decoding and/or rendering an audio sound field representation for audio playback. In another embodiment, the invention relates to a device for decoding and/or rendering an audio sound field representation for audio playback. In yet another embodiment, the invention relates to a computer readable medium having stored on it executable instructions to cause a computer to perform a method for decoding and/or rendering an audio sound field representation for audio playback.

Generally, the invention uses the following approach. First, panning functions are derived that are dependent on a loudspeaker setup that is used for playback. Second, a decode matrix (e.g. Ambisonics decode matrix) is computed from these panning functions (or a mix matrix obtained from the panning functions) for all loudspeakers of the loudspeaker setup. In a third step, the decode matrix is generated and processed to be energy preserving. Finally, the decode matrix is filtered in order to smooth the loudspeaker panning main lobe and suppress side lobes. The filtered decode matrix is used to render the audio signal for the given loudspeaker setup. Side lobes are a side effect of rendering and provide audio signals in unwanted directions. Since the rendering is optimized for the given loudspeaker setup, side lobes are disturbing. It is one of the advantages of the present invention that the side lobes are minimized, so that directivity of the loudspeaker signals is improved.

According to one embodiment of the invention, a method for rendering/decoding an audio sound field representation for audio playback comprises steps of buffering received HOA time samples b(t), wherein blocks of M samples and a time index □ are formed, filtering the coefficients B(□) to obtain frequency filtered coefficients $\hat{B}(\mu)$, rendering the frequency filtered coefficients $\hat{B}(\mu)$ to a spatial domain using a decode matrix D, wherein a spatial signal W(□) is obtained. In one embodiment, further steps comprise delaying the time samples w(t) individually for each of the L channels in delay lines, wherein L digital signals are obtained, and Digital-to-Analog (D/A) converting and amplifying the L digital signals, wherein L analog loudspeaker signals are obtained.

The decode matrix D for the rendering step, i.e. for rendering to a given arrangement of target speakers, is obtained by steps of obtaining a number of target speakers and positions of the speakers, determining positions of a spherical modeling grid and a HOA order, generating a mix matrix from the positions of a spherical modeling grid and the positions of the speakers, generating a mode matrix from the spherical modeling grid and the HOA order, calculating a first decode matrix from the mix matrix G and the mode matrix $\tilde{\Psi}$, and smoothing and scaling the first decode matrix with smoothing and scaling coefficients, wherein the decode matrix is obtained.

According to another aspect, a device for decoding an audio sound field representation for audio playback comprises a rendering processing unit having a decode matrix calculating unit for obtaining the decode matrix D, the decode matrix calculating unit comprising means for obtaining a number L of target speakers and means for obtaining positions $\Omega_L$ of the speakers, means for determining positions a spherical modeling grid $\Omega_S$ and means for obtaining a HOA order N, and first processing unit for generating a mix matrix G from the positions of the spherical modeling grid $\Omega_S$ and the positions of the speakers, second processing unit for generating a mode matrix $\tilde{\psi}$ from the spherical modeling grid $\Omega_S$ and the HOA order N, third processing unit for performing a compact singular value decomposition of the product of the mode matrix $\tilde{\psi}$ with the Hermitian transposed mix matrix G according to $USV^H=\tilde{\psi}G^H$, where U, V are derived from Unitary matrices and S is a diagonal matrix with singular value elements, calculating means for calculating a first decode matrix $\hat{D}$ from the matrices U, V according to $\hat{D}=V\hat{S}U^H$, wherein $\hat{S}$ is either an identity matrix or a diagonal matrix derived from said diagonal matrix with singular value elements, and a smoothing and scaling unit for smoothing and scaling the first decode matrix $\hat{D}$ with smoothing coefficients $\boldsymbol{h}$, wherein the decode matrix D is obtained.

According to yet another aspect, a computer readable medium has stored on it executable instructions that when executed on a computer cause the computer to perform a method for decoding an audio sound field representation for audio playback as disclosed above.

According to an aspect of the invention, a method for rendering a Higher-Order Ambisonics (HOA) representation of a sound or sound field, includes rendering coefficients of the HOA sound field representation from a frequency domain to a spatial domain based on a smoothed decode matrix $\hat{D}$, determining a mix matrix G based on L speakers and positions of a spherical modelling grid related to a HOA order N; determining a mode matrix $\tilde{\psi}$ based on the spherical modelling grid and the HOA order N; wherein a compact singular value decomposition of a product of the mode matrix $\tilde{\psi}$ with a Hermitian transposed mix matrix $G^H$ is determined based on $USV^H=\tilde{\psi}G^H$, wherein U, V are based on Unitary matrices and S is based on a diagonal matrix with singular value elements, and a first decode matrix $\hat{D}$ is determined based on the matrices U, V based on $\hat{D}=V\hat{S}U^H$, wherein N is a truncated compact singular value decomposition matrix that is either an identity matrix or a modified diagonal matrix, the modified diagonal matrix being determined based on the diagonal matrix with singular value elements by replacing a singular value element that is larger or equal than a threshold by ones, and replacing a singular value element that is smaller than the threshold by zeros, and wherein the smoothed decode matrix $\tilde{D}$ is determined based on smoothing and scaling of the first decode matrix $\hat{D}$ with smoothing coefficients, and wherein a rendering matrix D is determined based on a Frobenius norm of the smoothed decode matrix $\tilde{D}$.

The smoothing may be based on a first smoothing method that is based on a determination of $L \geq O_{3D}$, and the smoothing is further based on a second smoothing method that is based on a determination of $L < O_{3D}$, wherein $O_{3D}=(N+1)^2$, and wherein the smoothed decode matrix $\tilde{D}$ is obtained based on the smoothing. The second smoothing method may be based on weighting coefficients $\boldsymbol{h}$ that are based on elements of a Kaiser window. The Kaiser window may be determined based on $\mathcal{K}$=KaiserWindow(len, width), wherein len=2N+1, width=2N, wherein $\mathcal{K}$ is a vector with 2N+1 real valued elements based on $$\mathcal{K}_i = \frac{I_0\left(\text{width}\sqrt{1-\left(\frac{2i}{\text{len}-1}-1\right)^2}\right)}{I_0(\text{width})},$$

wherein $I_o$ denotes a zero-order Modified Bessel function of a first kind. The first smoothing method may be based on weighting coefficients $\boldsymbol{h}$ that are based on zeros of Legendre polynomials of order N+1.

The first decode matrix $\hat{D}$ may be smoothed to obtain the smoothed decode matrix $\tilde{D}$, and the smoothed decode matrix $\tilde{D}$ is scaled based on a constant scaling factor $c_f$. The method may include buffering and serializing a spatial signal W which is obtained based on the rendering the coefficients of the HOA sound field representation, wherein time samples w(t) for L channels are obtained; and delaying time samples w(t) individually for each of the L channels in delay lines, wherein L digital signals are obtained; and wherein the delay lines compensate different loudspeaker distances.

An aspect is directed to an apparatus for rendering a Higher-Order Ambisonics (HOA) representation of a sound or sound field, comprising a decoder configured to decode coefficients of the HOA sound field representation. The decoder includes a renderer configured to render coefficients of the HOA sound field representation from a frequency domain to a spatial domain based on a smoothed decode matrix $\tilde{D}$, a processing unit configured to determine a mix matrix G based on L speakers and positions of a spherical modelling grid related to a HOA order N and determining a mode matrix $\tilde{\psi}$ based on the spherical modelling grid and the HOA order N and determining a mode matrix $\tilde{\psi}$ based on the spherical modelling grid and the HOA order N; wherein the processing unit is further configured to determine a compact singular value decomposition of a product of the mode matrix $\tilde{\psi}$ with a Hermitian transposed mix matrix $G^H$ is determined based on $USV^H=\tilde{\psi}G^H$, and wherein U, V are based on Unitary matrices and S is based on a diagonal matrix with singular value elements, and a first decode matrix $\hat{D}$ is determined based on the matrices U, V based on $\hat{D}=V\hat{S}U^H$, wherein $\hat{S}$ is a truncated compact singular value decomposition matrix that is either an identity matrix or a modified diagonal matrix, the modified diagonal matrix being determined based on the diagonal matrix with singular value elements by replacing a singular value element that is larger or equal than a threshold by ones, and replacing a singular value element that is smaller than the threshold by zeros, and wherein the smoothed decode matrix $\tilde{D}$ is determined based on smoothing and scaling of the first decode matrix $\hat{D}$ with smoothing coefficients, wherein a rendering matrix D is determined based on a Frobenius norm of the smoothed decode matrix $\tilde{D}$. The decoder may be configured to apply the smoothed decode matrix $\tilde{D}$ to the HOA sound field representation to determine a decoded audio signal. The apparatus may further comprise a storage for storing the smoothed decode matrix $\hat{D}$. The smoothing may be based on a first smoothing method that is based on a determination of $L \geq O_{3D}$, and the smoothing is further based on a second smoothing method that is based on a determination of $L < O_{3D}$, wherein $O_{3D}=(N+1)^2$, and wherein the smoothed decode matrix $\tilde{D}$ is obtained based on the smoothing. The second smoothing method may be based on weighting coefficients $\hbar$ that are based on elements of a Kaiser window. The Kaiser window is determined based on $\mathcal{K}$=KaiserWindow (len, width), wherein len=2N+1, width=2N, wherein $\mathcal{K}$ is a vector with 2N+1 real valued elements based on $$\mathcal{K}_i = \frac{I_0\left(\text{width}\sqrt{1-\left(\frac{2i}{\text{len}-1}-1\right)^2}\right)}{I_0(\text{width})},$$

wherein $I_o$ denotes a zero-order Modified Bessel function of a first kind. The first smoothing method may be based on weighting coefficients $\hbar$ that are based on zeros of Legendre polynomials of order N+1. The first decode matrix $\hat{D}$ may be smoothed to obtain the smoothed decode matrix $\tilde{D}$, and the smoothed decode matrix $\tilde{D}$ is scaled based on a constant scaling factor $c_f$.

An aspect of the present invention is directed to methods, apparatus and non-transitory computer readable medium having stored thereon executable instructions to cause a computer to perform a method of decoding a Higher-Order Ambisonics (HOA) representation of a sound or sound field, the method comprising:

- receiving a smoothed decode matrix $\tilde{D}$ that is based on a mix matrix G and a mode matrix $\tilde{\psi}$, wherein the mix matrix G was determined based on L speakers and positions of a spherical modelling grid related to a HOA order N, wherein the mode matrix $\tilde{\psi}$ was determined based on the spherical modelling grid and the HOA order N,
- wherein the smoothed decode matrix $\tilde{D}$ was determined based on smoothing and scaling of a first decode matrix $\hat{D}$ with smoothing coefficients, wherein the first decode matrix $\hat{D}$ was determined based on $\hat{D}=V\hat{S}U^H$, wherein U, V are based on Unitary matrices, wherein a compact singular value decomposition of a product of the mode matrix $\tilde{\psi}$ with a Hermitian transposed mix matrix $G^H$ is determined based on $USV^H=\tilde{\psi}G^H$, wherein S is based on a diagonal matrix with singular value elements, and wherein $\hat{S}$ is a truncated compact singular value decomposition matrix that is either an identity matrix or a modified diagonal matrix, the modified diagonal matrix being determined based on the diagonal matrix with singular value elements by replacing a singular value element that is larger or equal than a threshold by ones, and replacing a singular value element that is smaller than the threshold by zeros, and wherein a value of the threshold for each singular value element depends on the value of the each singular value element; and
- rendering coefficients of the HOA sound field representation from a frequency domain to a spatial domain based on the smoothed decode matrix $\tilde{D}$.

Further objects, features and advantages of the invention will become apparent from a consideration of the following description and the appended claims when taken in connection with the accompanying drawings.

BRIEF DESCRIPTION OF THE DRAWINGS

Exemplary embodiments of the invention are described with reference to the accompanying drawings, which show in FIG. 1 illustrates an exemplary flow-chart of a method according to one embodiment of the invention.

DETAILED DESCRIPTION OF THE INVENTION

In general, the invention relates to rendering (i.e. decoding) sound field formatted audio signals such as Higher Order Ambisonics (HOA) audio signals to loudspeakers, where the loudspeakers are at symmetric or asymmetric, regular or non-regular positions. The audio signals may be suitable for feeding more loudspeakers than available, e.g. the number of HOA coefficients may be larger than the number of loudspeakers. The invention provides energy preserving decode matrices for decoders with very good directional properties, i.e. speaker directivity lobes generally comprise a stronger directive main lobe and smaller side lobes than speaker directivity lobes obtained with conventional decode matrices. Energy preserving means that the energy within the HOA directive signal is preserved after decoding, so that e.g. a constant amplitude directional spatial sweep will be perceived with constant loudness.

Figure 1:
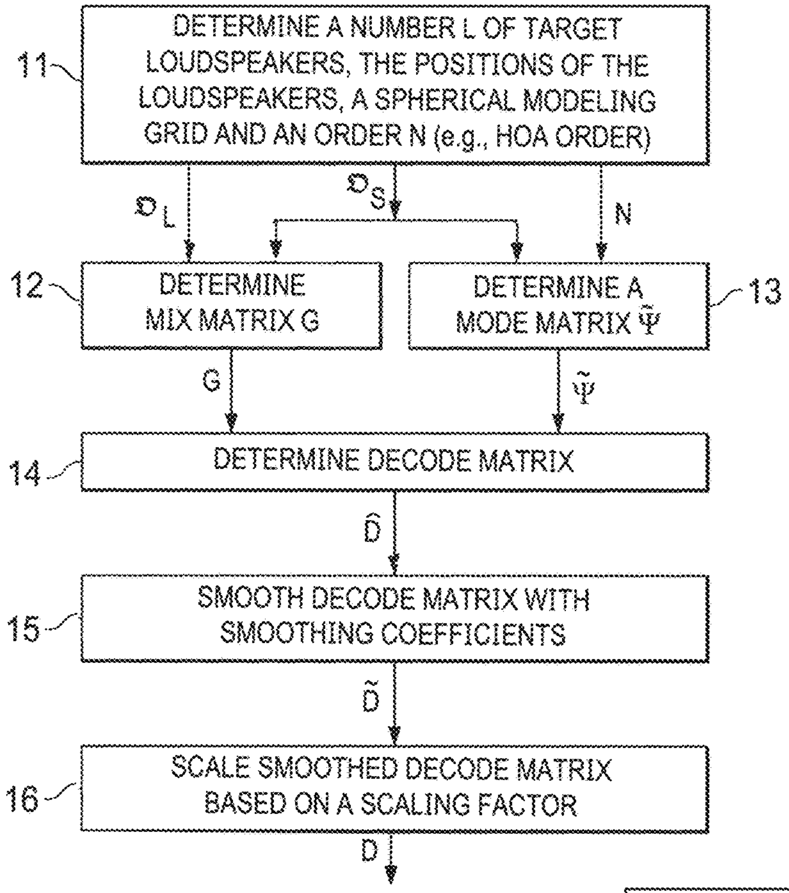

FIG. 1 shows a flow-chart of a method according to one embodiment of the invention. In this embodiment, the method for rendering (i.e. decoding) a HOA audio sound field representation for audio playback uses a decode matrix that is generated as follows: first, a number L of target loudspeakers, the positions $\mathfrak{D}_L$ of the loudspeakers, a spherical modeling grid $\mathfrak{D}_S$ and an order N (e.g. HOA order) are determined 11. From the positions $\mathfrak{D}_L$ of the speakers and the spherical modeling grid $\mathfrak{D}_S$, a mix matrix G is generated 12, and from the spherical modeling grid $\mathfrak{D}_S$ and the HOA order N, a mode matrix $\tilde{\psi}$ is generated 13. A first decode matrix $\hat{D}$ is calculated 14 from the mix matrix G and the mode matrix $\tilde{\psi}$. The first decode matrix $\hat{D}$ is smoothed 15 with smoothing coefficients, wherein a smoothed decode matrix $\tilde{D}$ is obtained, and the smoothed decode matrix $\tilde{D}$ is scaled 16 with a scaling factor obtained from the smoothed decode matrix $\tilde{D}$, wherein the decode matrix D is obtained. In one embodiment, the smoothing 15 and scaling 16 is performed in a single step.

In one embodiment, the smoothing coefficients $\boldsymbol{h}$ are obtained by one of two different methods, depending on the number of loudspeakers L and the number of HOA coefficient channels $O_{3D}=(N+1)^2$. If the number of loudspeakers L is below the number of HOA coefficient channels $O_{3D}$, a new method for obtaining the smoothing coefficients is used.

In one embodiment, a plurality of decode matrices corresponding to a plurality of different loudspeaker arrangements are generated and stored for later usage. The different loudspeaker arrangements can differ by at least one of the number of loudspeakers, a position of one or more loudspeakers and an order N of an input audio signal. Then, upon initializing the rendering system, a matching decode matrix is determined, retrieved from the storage according to current needs, and used for decoding.

In one embodiment, the decode matrix D is obtained by performing a compact singular value decomposition of the product of the mode matrix $\tilde{\psi}$ with the Hermitian transposed mix matrix $G^H$ according to $USV^H=\tilde{\psi}G^H$, and calculating a first decode matrix D from the matrices U, V according to $D=VU^H$. The U, V are derived from Unitary matrices, and S is a diagonal matrix with singular value elements of said compact singular value decomposition of the product of the mode matrix $\tilde{\psi}$ with the Hermitian transposed mix matrix $G^H$. Decode matrices obtained according to this embodiment are often numerically more stable than decode matrices obtained with an alternative embodiment described below. The Hermitian transposed of a matrix is the conjugate complex transposed of the matrix.

In the alternative embodiment, the decode matrix D is obtained by performing a compact singular value decomposition of the product of the Hermitian transposed mode matrix $\tilde{\psi}^H$ with the mix matrix G according to $USV^H=G\tilde{\psi}^H$, wherein a first decode matrix is derived by $\hat{D}=UV^H$.

In one embodiment, a compact singular value decomposition is performed on the mode matrix $\tilde{\psi}$ and mix matrix G according to $USV^H=G\tilde{\psi}^H$, where a first decode matrix is derived by $\hat{D}=U\hat{S}V^H$, where $\hat{S}$ is a truncated compact singular value decomposition matrix that is derived from the singular value decomposition matrix S by replacing all singular values larger or equal than a threshold thr by ones, and replacing elements that are smaller than the threshold thr by zeros. The threshold thr depends on the actual values of the singular value decomposition matrix and may be, exemplarily, in the order of $0{,}06*S_1$ (the maximum element of S).

In one embodiment, a compact singular value decomposition is performed on the mode matrix $\tilde{\psi}$ and mix matrix G according to $SU^H=G\tilde{\psi}^H$, where a first decode matrix is derived by $\hat{D}=V\hat{S}U^H$. The $\hat{S}$ and threshold thr are as described above for the previous embodiment. The threshold thr is usually derived from the largest singular value.

In one embodiment, two different methods for calculating the smoothing coefficients are used, depending on the HOA order N and the number of target speakers L: if there are less target speakers than HOA channels, i.e. if $O_{3D}=(N^2+1)>L$, the smoothing and scaling coefficients $\boldsymbol{h}$ corresponds to a conventional set of max $r_E$ coefficients that are derived from the zeros of the Legendre polynomials of order N+1; otherwise, if there are enough target speakers, i.e. if $O_{3D}=(N^2+1)\leq L$, the coefficients of $\boldsymbol{h}$ are constructed from the elements $\mathcal{K}$ of a Kaiser window with len=(2N+1) and width=2N according to $\boldsymbol{h}=c_f[\mathcal{K}_{N+1}, \mathcal{K}_{N+2}, \mathcal{K}_{N+2}, \mathcal{K}_{N+2}, \mathcal{K}_{N+3}, \mathcal{K}_{N+3}, \ldots, \mathcal{K}_{2N}]^T$ with a scaling factor $c_f$. The used elements of the Kaiser window begin with the $(N+1)^{st}$ element, which is used only once, and continue with subsequent elements which are used repeatedly: the $(N+2)^{nd}$ element is used three times, etc.

In one embodiment, the scaling factor is obtained from the smoothed decoding matrix. In particular, in one embodiment it is obtained according to $$c_f = \frac{1}{\sqrt{\sum_{L=1}^{L} \sum_{q=1}^{O_{3D}} |\tilde{d}_{l,q}|^2}}.$$

In the following, a full rendering system is described. A major focus of the invention is the initialization phase of the renderer, where a decode matrix D is generated as described above. Here, the main focus is a technology to derive the one or more decoding matrices, e.g. for a code book. For generating a decode matrix, it is known how many target loudspeakers are available, and where they are located (i.e. their positions).

Figure 2:
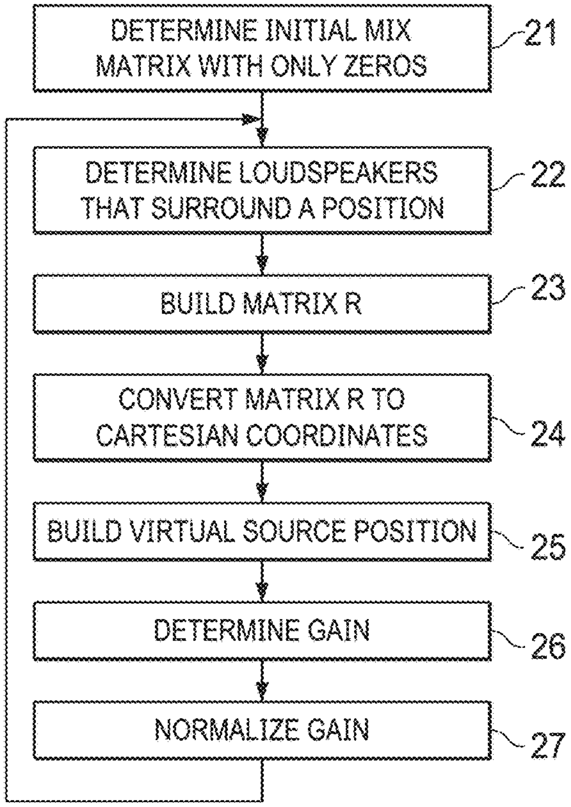
FIG. 2 illustrates an exemplary flow-chart of a method for building the mix matrix G.

FIG. 2 shows a flow-chart of a method for building the mix matrix G, according to one embodiment of the invention. In this embodiment, an initial mix matrix with only zeros is created 21, and for every virtual source s with an angular direction $\Omega_s=[\theta_s, \phi_s]^T$ and radius $r_s$, the following steps are performed. First, three loudspeakers $l_1$, $l_2$, $l_3$ are determined 22 that surround the position $[1, \Omega_s^T]$, wherein unit radii are assumed, and a matrix $R=[r_{l_1}, r_{l_2}, r_{l_3}]$ is built 23, with $r_{l_i}=[1, \Omega_{l_i}^T]^T$. The matrix R is converted 24 to Cartesian coordinates, according to $L_t$=spherical_to_cartesian(R). Then, a virtual source position is built 25 according to $s=(\sin\Theta_s \cos\phi_s, \sin\Theta_s \sin\phi_s, \cos\Theta_s)^T$, and a gain g is calculated 26 according to $g=L_t^{-1}s$, with $g=(g_{l_1}, g_{l_1}, g_{l_3})^T$. The gain is normalized 27 according to $=g/\|g\|_2$, and the corresponding elements $G_{l,s}$ of G are replaced with the normalized gains: $G_{l_1,s}=g_{l_1}$, $G_{l_2,s}=g_{l_2}$, $G_{l_3,s}=g_{l_3}$.

The following section gives a brief introduction to Higher Order Ambisonics (HOA) and defines the signals to be processed, i.e. rendered for loudspeakers. Higher Order Ambisonics (HOA) is based on the description of a sound field within a compact area of interest, which is assumed to be free of sound sources. In that case the spatiotemporal behavior of the sound pressure p(t, x) at time t and position $x=[r,\theta,\phi]^T$ within the area of interest (in spherical coordinates: radius r, inclination θ, azimuth ϕ) is physically fully determined by the homogeneous wave equation. It can be shown that the Fourier transform of the sound pressure with respect to time, i.e., $$P(\omega,x)=\mathcal{F}_t\{p(t,x)\} \quad (1)$$

where ω denotes the angular frequency (and $\mathcal{F}_t\{\ \}$ corresponds to $\int_{-\infty}^{\infty}p(t,x)\,e^{-\omega t}dt$), may be expanded into the series of Spherical Harmonics (SHs) according to [13]:

$$P(kc_s, x) = \sum_{n=0}^{\infty}\sum_{m=-n}^{n} A_n^m(k)j_n(kr)Y_n^m(\theta, \phi) \quad (2)$$

In eq. (2), $c_s$ denotes the speed of sound and $$k = \frac{\omega}{c_s}$$

angular wave number. Further, $j_n(\cdot)$ indicate the spherical Bessel functions of the first kind and order n and $Y_n^m(\cdot)$ denote the Spherical Harmonics (SH) of order n and degree m. The complete information about the sound field is actually contained within the sound field coefficients $A_n^m(k)$. It should be noted that the SHs are complex valued functions in general. However, by an appropriate linear combination of them, it is possible to obtain real valued functions and perform the expansion with respect to these functions.

Related to the pressure sound field description in eq. (2) a source field can be defined as:

$$D(kc_s, \Omega) = \sum_{n=0}^{\infty}\sum_{m=-n}^{n} B_n^m(k)Y_n^m(\Omega), \quad (3)$$

with the source field or amplitude density [12]D(k $c_s$, Ω) depending on angular wave number and angular direction $\Omega=[\theta, \phi]^T$. A source field can consist of far-field/near-field, discrete/continuous sources [1]. The source field coefficients $B_n^m$ are related to the sound field coefficients $A_n^m$ by, [1]:

$$A_n^m = \begin{cases} 4\pi i^n B_n^m & \text{for the far field} \\ -ikh_n^{(2)}(kr_s)B_n^m & \text{for the near field} \end{cases} \quad (4)$$

where $h_n^{(2)}$ is the spherical Hankel function of the second kind and $r_s$ is the source distance from the origin.

Signals in the HOA domain can be represented in frequency domain or in time domain as the inverse Fourier transform of the source field or sound field coefficients. The following description will assume the use of a time domain representation of source field coefficients:

$$b_n^m=i\mathcal{F}_t\{B_n^m\} \quad (5)$$

of a finite number: The infinite series in eq. (3) is truncated at n=N. Truncation corresponds to a spatial bandwidth limitation. The number of coefficients (or HOA channels) is given by:

$$O_{3D}=(N+1)^2 \text{ for 3D} \quad (6)$$

or by $O_{2D}$=2N+1 for 2D only descriptions. The coefficients $b_n^m$ in comprise the Audio information of one time sample t for later reproduction by loudspeakers. They can be stored or transmitted and are thus subject of data rate compression. A single time sample t of coefficients can be represented by vector b(t) with $O_{3D}$ elements:

$$b(t):=[b_0^0(t),b_1^{-1}(t),b_1^0(t),b_1^1(t),b_2^{-2}(t), \ldots ,b_N^N(t)]^T \quad (7)$$

and a block of M time samples by matrix $B\in\mathbb{C}^{O_{3D}\times M}$ $$B:=[b(t_{START}+1),b(t_{START}+2), \ldots ,b(t_{START}+M)] \quad (8)$$

Two dimensional representations of sound fields can be derived by an expansion with circular harmonics. This is a special case of the general description presented above using a fixed inclination of $$\theta = \frac{\pi}{2},$$

different weighting of coefficients and a reduced set to $O_{2D}$ coefficients (m=±n). Thus, all of the following considerations also apply to 2D representations; the term "sphere" then needs to be substituted by the term "circle".

In one embodiment, metadata is sent along the coefficient data, allowing an unambiguous identification of the coefficient data. All necessary information for deriving the time sample coefficient vector b(t) is given, either through transmitted metadata or because of a given context. Furthermore, it is noted that at least one of the HOA order N or $O_{3D}$, and in one embodiment additionally a special flag together with $r_s$ to indicate a nearfield recording are known at the decoder.

Next, rendering a HOA signal to loudspeakers is described. This section shows the basic principle of decoding and some mathematical properties.

Basic decoding assumes, first, plane wave loudspeaker signals and, second, that the distance from speakers to origin can be neglected. A time sample of HOA coefficients b rendered to L loudspeakers that are located at spherical directions $\hat{\Omega}_l=[\hat{\theta}_l, \hat{\phi}_l]^T$ with l=1, . . . , L can be described by [10]:

$$w=Db \quad (9)$$

$w\in\mathbb{R}^{L\times 1}$L$D\in\mathbb{C}^{L\times O_{3D}}$ where represents a time sample of speaker signals and decode matrix. A decode matrix can be derived by $$w\in\mathbb{R}^{L\times 1}LD\in\mathbb{C}^{L\times O_{3D}}$$

$$D=\psi^+ \quad (10)$$

where $\psi^+$ is the pseudo inverse of the mode matrix ψ. The mode-matrix ψ If is defined as $$\psi=[y_1, \ldots ,y_L] \quad (11)$$

with $\psi\in\mathbb{C}^{O_{3D}\times L}$ and $y_l=[Y_0^0(\hat{\Omega}_l), Y_1^{-1}(\hat{\Omega}_l), \ldots, Y_N^N(\hat{\Omega}_l)]^H$ consisting of the Spherical Harmonics of the speaker directions $\hat{\Omega}_l=[\hat{\theta}_l, \hat{\phi}_l]^T$ where H denotes conjugate complex transposed (also known as Hermitian).

Next, a pseudo inverse of a matrix by Singular Value Decomposition (SVD) is described. One universal way to derive a pseudo inverse is to first calculate the compact SVD:

$$\psi=USV^H \quad (12)$$

where $U\in\mathbb{C}^{O_{3D}\times K}$, $V\in\mathbb{C}^{L\times K}$ are derived from rotation matrices and S=diag $(S_1, \ldots, S_K)\in\mathbb{R}^{K\times K}$ is a diagonal matrix of the singular values in descending order $S_1\geq S_2\geq \ldots \geq S_K$ with K>0 and K≤min($O_{3D}$, L). The pseudo inverse is determined by $$\psi^{+}=V\hat{S}U^{H} \tag{13}$$

where $\hat{S}=\text{diag}(S_1^{-1}, \ldots, S_K^{-1})$. For bad conditioned matrices with very small values of $S_k$, the corresponding inverse values $S_k^{-1}$ are replaced by zero. This is called Truncated Singular Value Decomposition. Usually a detection threshold with respect to the largest singular value $S_1$ is selected to identify the corresponding inverse values to be replaced by zero.

In the following, the energy preservation property is described. The signal energy in HOA domain is given by $$E=b^{H}b \tag{14}$$

and the corresponding energy in the spatial domain by $$\hat{E}=w^{H}w=b^{H}D^{H}Db. \tag{15}$$

The ratio Ê/E for an energy preserving decoder matrix is (substantially) constant. This can only be achieved if $D^{H}D=cI$, with identity matrix I and constant $c\in\mathbb{R}$. This requires D to have a norm-2 condition number cond(D)=1. This again requires that the SVD (Singular Value Decomposition) of D produces identical singular values: $D=USV^{H}$ with $$S=\text{diag}(S_K, \ldots, S_K).$$

Generally, energy preserving renderer design is known in the art. An energy preserving decoder matrix design for L≥$O_{3D}$ is proposed in by $$D=VU^{H} \tag{16}$$

where Ŝ from eq. (13) is forced to be Ŝ=I and thus can be dropped in eq. (16). The product $D^{H}D=UV^{H}VU^{H}=I$ and the ratio E 1E becomes one. A benefit of this design method is the energy preservation which guarantees a homogenous spatial sound impression where spatial pans have no fluctuations in perceived loudness. A drawback of this design is a loss in directivity precision and strong loudspeaker beam side lobes for asymmetric, non-regular speaker positions (see FIG. 8-9). The present invention can overcome this drawback.

Figure 10:
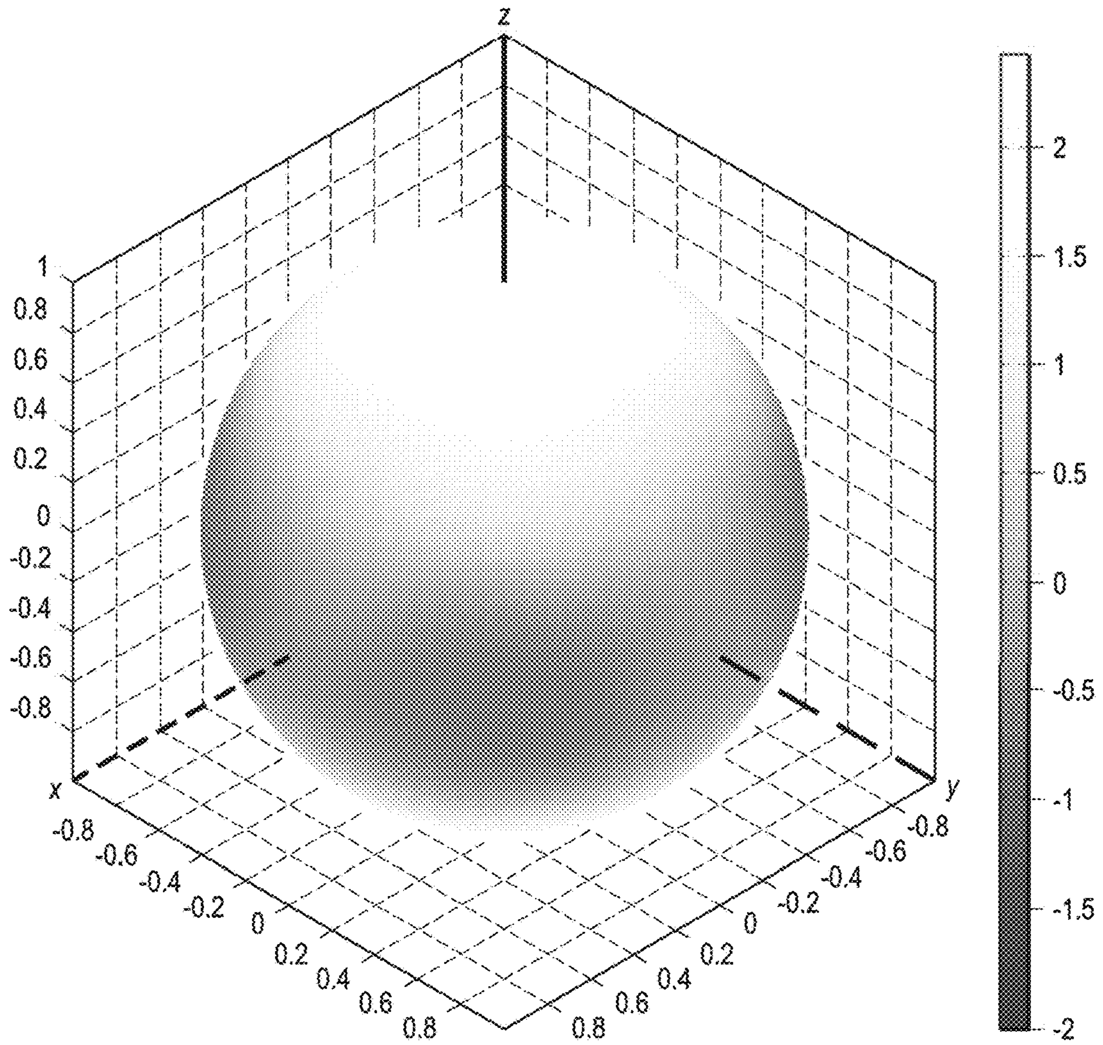
FIG. 10 illustrates an energy diagram showing the E/E ratio having fluctuations larger than 4 dB for a decode matrix obtained with prior art [2], with N=3.

Also, a renderer design for non-regular positioned speakers is known in the art: In [2], a decoder design method for L≥$O_{3D}$ and L<$O_{3D}$ is described which allows rendering with high precision in reproduced directivity. A drawback of this design method is that the derived renderers are not energy preserving (see FIG. 10-11).

Spherical convolution can be used for spatial smoothing. This is a spatial filtering process, or a windowing in the coefficient domain (convolution). Its purpose is to minimize the side lobes, so-called panning lobes. A new coefficient $\tilde{b}_n^m$ is given by the weighted product of the original HOA coefficient $b_n^m$ and a zonal coefficient $h_n^0$[5]:

$$\tilde{b}_n^m = 2\pi\sqrt{\frac{4\pi}{2n+1}}\,h_n^0 b_n^m \tag{17}$$

This is equivalent to a left convolution on $S^2$ in the spatial domain [5]. Conveniently this is used in [5] to smooth the directive properties of loudspeaker signals prior to rendering/decoding by weighting the HOA coefficients B by:

$$B=\text{diag}(\mathbf{h})B, \tag{18}$$

with vector $$\mathbf{h} = d_f\left(h_0^0, \frac{h_1^0}{\sqrt{3}}, \frac{h_1^0}{\sqrt{3}}, \frac{h_1^0}{\sqrt{3}}, \frac{h_2^0}{\sqrt{5}}, \frac{h_2^0}{\sqrt{5}}, \ldots, \frac{h_N^0}{\sqrt{2N+1}}\right)^T$$

containing usually real valued weighting coefficients and a constant factor $d_f$. The idea of smoothing is to attenuate HOA coefficients with increasing order index n. A well-known example of smoothing weighting coefficients $\mathbf{h}$ are so called max $r_V$, max $r_E$ and inphase coefficients [4]. The first offers the default amplitude beam (trivial, $\mathbf{h}=(1, 1, \ldots, 1)^T$, a vector of length $O_{3D}$ with only ones), the second provides evenly distributed angular power and inphase features full side lobe suppression.

In the following, further details and embodiments of the disclosed solution are described.

First, a renderer architecture is described in terms of its initialization, start-up behavior and processing.

Every time the loudspeaker setup, i.e. the number of loudspeakers or position of any loudspeaker relative to the listening position changes, the renderer needs to perform an initialization process to determine a set of decoding matrices for any HOA-order N that supported HOA input signals have. Also, the individual speaker delays d 1 for the delay lines and speaker gains $g_l$ are determined from the distance between a speaker and a listening position. This process is described below. In one embodiment, the derived decoding matrices are stored within a code book. Every time the HOA audio input characteristics change, a renderer control unit determines currently valid characteristics and selects a matching decode matrix from the code book. Code book key can be the HOA order N or, equivalently, $O_{3D}$ (see eq. (6)).

Figure 3:
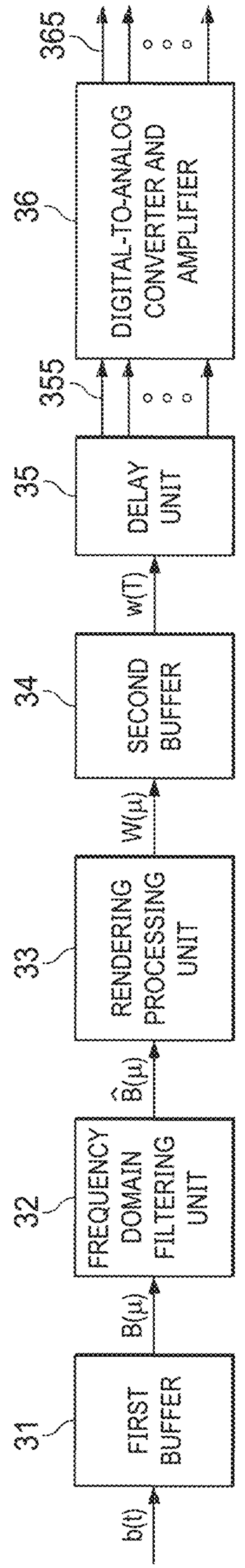
FIG. 3 illustrates an exemplary block diagram of a renderer.

The schematic steps of data processing for rendering are explained with reference to FIG. 3, which shows a block diagram of processing blocks of the renderer. These are a first buffer 31, a Frequency Domain Filtering unit 32, a rendering processing unit 33, a second buffer 34, a delay unit 35 for L channels, and a digital-to-analog converter and amplifier 36.

The HOA time samples with time-index t and $O_{3D}$ HOA coefficient channels b(t) are first stored in the first buffer 31 to form blocks of M samples with block index pt. The coefficients of B(μ) are frequency filtered in the Frequency Domain Filtering unit 32 to obtain frequency filtered blocks B (μ). This technology is known (see [3]) for compensating for the distance of the spherical loudspeaker sources and enabling the handling of near field recordings. The frequency filtered block signals $\hat{B}(\mu)$ are rendered to the spatial domain in the rendering processing unit 33 by:

$$\mathbb{W}(\mu)=D\hat{B}(\mu) \tag{19}$$

with $W(\mu)\in\mathbb{R}^{L\times M}$ representing a spatial signal in L channels with blocks of M time samples. The signal is buffered in the second buffer 34 and serialized to form single time samples with time index t in L channels, referred to as w(t) in FIG. 3. This is a serial signal that is fed to L digital delay lines in the delay unit 35. The delay lines compensate for different distances of listening position to individual speaker/with a delay of $d_l$ samples. In principle, each delay line is a FIFO (first-in-first-out memory). Then, the delay compensated signals 355 are D/A converted and amplified in the digital-to-analog converter and amplifier 36, which provides signals 365 that can be fed to L loudspeakers. The speaker gain compensation $\mathfrak{g}_l$ can be considered before D/A conversion or by adapting the speaker channel amplification in analog domain.

The renderer initialization works as follows.

First, speaker number and positions need to be known. The first step of the initialization is to make available the new speaker number L and related positions $\hat{\mathfrak{D}}_L=[r_1, r_2, \ldots, r_L]$, with $r_l=[r_l, \hat{\theta}_l, \hat{\phi}_l]^T=[r_l, \hat{\Omega}_l^T]^T$, where $r_l$ is the distance from a listening position to a speaker l, and where $\hat{\theta}_l$, $\hat{\phi}_l$ are the related spherical angles. Various methods may apply, e.g. manual input of the speaker positions or automatic initialization using a test signal. Manual input of the speaker positions $\hat{\mathfrak{D}}_L$ may be done using an adequate interface, like a connected mobile device or a device-integrated user-interface for selection of predefined position sets. Automatic initialization may be done using a microphone array and dedicated speaker test signals with an evaluation unit to derive $\hat{\mathfrak{D}}$. The maximum distance $r_{max}$ is determined by $r_{max}=\max(r_1, \ldots, r_L)$, the minimal distance $r_{min}$ by $r_{min}=\min(r_1, \ldots, r_L)$.

The L distances $r_l$ and $r_{max}$ are input to the delay line and gain compensation 35. The number of delay samples for each speaker channel d 1 are determined by $$d_l = \lfloor (r_{max}-r_l) f_s / c + 0.5 \rfloor \tag{20}$$

with sampling rate $f_s$, speed of sound c(c≅343 m/s at a temperature of 20° celsius) and $\lfloor x+0.5 \rfloor$ indicating rounding to next integer. To compensate the speaker gains for different $r_l$, loudspeaker gains $\mathfrak{g}_l$ are determined by $$\mathfrak{g}_l = \frac{r_l}{r_{min}},$$

or are derived using an acoustical measurement.

Figure 4A:
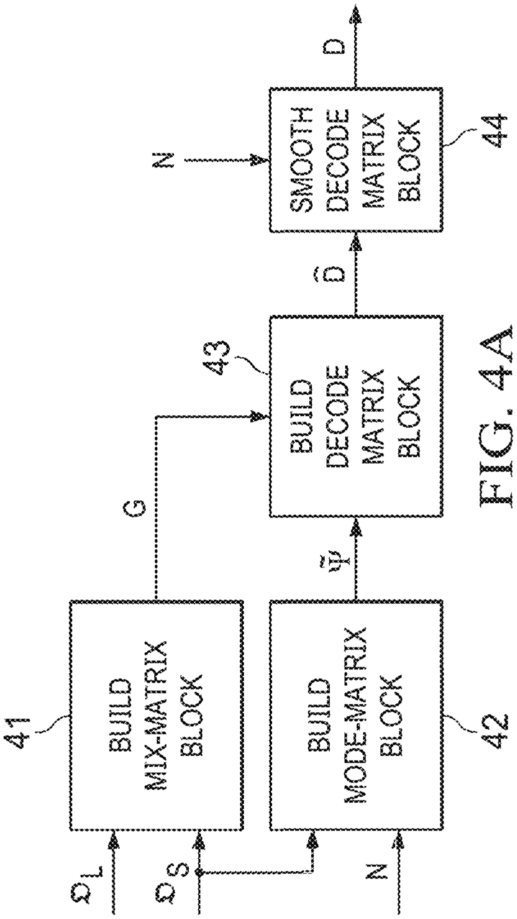
FIG. 4A illustrates an exemplary.
Figure 4B:
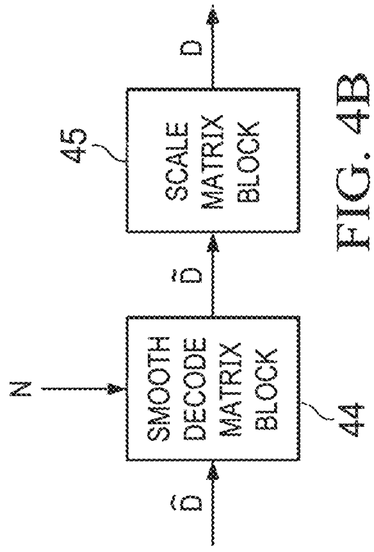
FIG. 4B illustrates an exemplary a flow-chart of schematic steps of a decode matrix generation process.
Figure 5:
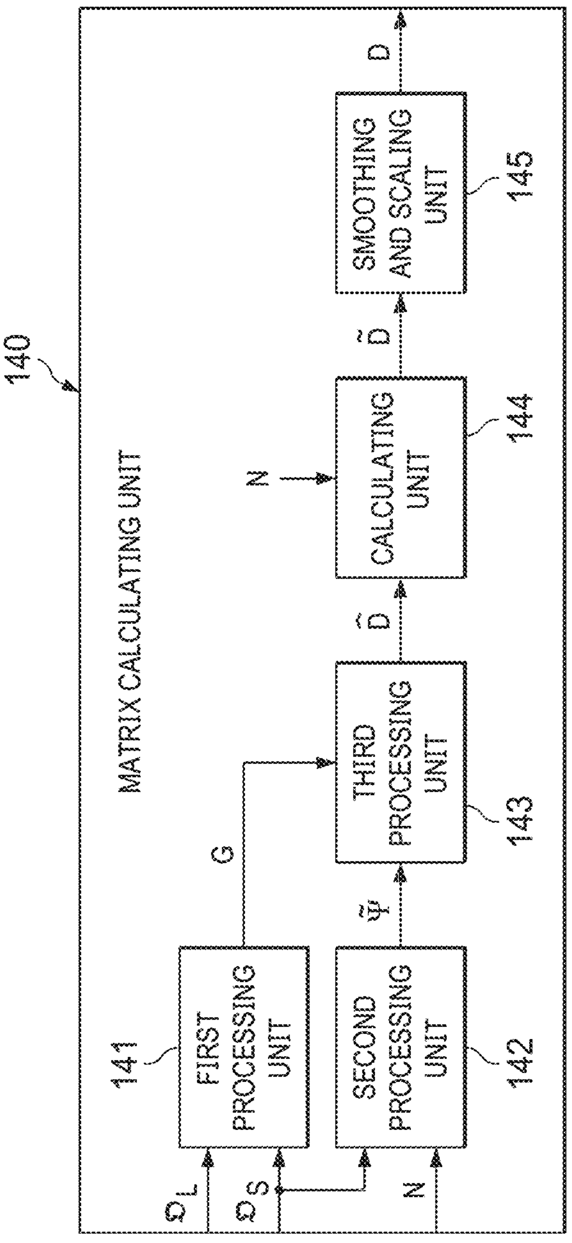
FIG. 5 illustrates an exemplary block diagram of a decode matrix generation unit.

Calculation of decoding matrices, e.g. for the code book, works as follows. Schematic steps of a method for generating the decode matrix, in one embodiment, are shown in FIGS. 4A and 4B. FIG. 5 shows, in one embodiment, processing blocks of a corresponding device for generating the decode matrix. Inputs are speaker directions $\hat{\mathfrak{D}}_L$, a spherical modeling grid $\hat{\mathfrak{D}}_S$ and the HOA-order N.

The speaker directions $\hat{\mathfrak{D}}_L=[\hat{\Omega}_1, \ldots, \hat{\Omega}_L]$ can be expressed as spherical angles $\hat{\Omega}_l==[\hat{\theta}_l, \hat{\phi}_l]^T$, and the spherical modeling grid $\hat{\mathfrak{D}}_S=[\Omega_1, \ldots, \Omega_S]$ by spherical angles $\Omega_S=[\theta_s, \phi_s]^T$. The number of directions is selected larger than the number of speakers (S>L) and larger than the number of HOA coefficients ($S>O_{3D}$). The directions of the grid should sample the unit sphere in a very regular manner. Suited grids are discussed in [6], [9] and can be found in [7], [8]. The grid $\hat{\mathfrak{D}}_S$ is selected once. As an example, a S=324 grid from [6] is sufficient for decoding matrices up to HOA-order N=9. Other grids may be used for different HOA orders. The HOA-order N is selected incremental to fill the code book from N=1, . . . , $N_{max}$, with $N_{max}$ as the maximum HOA-order of supported HOA input content.

The speaker directions V L and the spherical modeling grid $\hat{\mathfrak{D}}_S$ are input to a Build Mix-Matrix block 41, which generates a mix matrix G thereof. The a spherical modeling grid $\hat{\mathfrak{D}}_S$ and the HOA order N are input to a Build Mode-Matrix block 42, which generates a mode matrix $\tilde{\psi}$ thereof. The mix matrix $\psi$ and the mode matrix $\psi$ are input to a Build Decode Matrix block 43, which generates a decode matrix $\hat{D}$ thereof. The decode matrix is input to a Smooth Decode Matrix block 44, which smoothes and scales the decode matrix. Further details are provided below. Output of the Smooth Decode Matrix block 44 is the decode matrix D, which is stored in the code book with related key N (or alternatively $O_{3D}$). In the Build Mode-Matrix block 42, the spherical modeling grid $\mathfrak{D}_S$ is used to build a mode matrix analogous to eq. (11): $\tilde{\psi}=[y_1, \ldots y_s]$ with $y_s=[Y_0^0(\Omega_s), Y_1^{-1}(\Omega_s), \ldots, Y_N^N(\Omega_s)]^H$. It is noted that the mode matrix $\tilde{\psi}$ is referred to as Θ in [2].

In the Build Mix-Matrix block 41, a mix matrix G is created with $G\in\mathbb{R}^{L\times S}$. It is noted that the mix matrix G is referred to as W in [2]. An $l^{th}$ row of the mix matrix G consists of mixing gains to mix S virtual sources from directions $\mathfrak{D}_S$ to speaker l. In one embodiment, Vector Base Amplitude Panning (VBAP) is used to derive these mixing gains, as also in [2].

The algorithm to derive G is summarized in the following.

| | |
|---|---|
| 1 | Create G with zero values (i.e. initialize G) |
| 2 | for every s = 1 ...S |
| 3 | { |
| 4 | Find 3 speakers $l_1, l_2, l_3$ that surround the position $[1, \Omega_s^T]^T$, assuming unit radii and build matrix $R=[r_{l_1}, r_{l_2}, r_{l_3}]$ with $r_{l_i}=[1, \hat{\Omega}_{l_i}^T]^T$. |
| 5 | Calculate $L_t$ = spherical_to_cartesian (R) in Cartesian coordinates. |
| 6 | Build virtual source position s = $(\sin\Theta_s \cos\phi_s, \sin\Theta_s \sin\phi_s, \cos\Theta_s)^T$. |
| 7 | Calculate $g=L_t^{-1}s$, with $g=(g_{l_1}, g_{l_1}, g_{l_3})^T$ |
| 8 | Normalize gains: $g=g/\lVert g \rVert_2$ |
| $G_{l,s}GgG_{l_1,s}=g_{l_1}$ $G_{l_2,s}=g_{l_2}$ $G_{l_3,s}=g_{l_3}$9 | Fill related elements of with elements of : $G_{l,s}GgG_{l_1,s}=g_{l_1}$ $G_{l_2,s}=g_{l_2}G_{l_3,s}=g_{l_3}$ , , |
| 10 | } |

In the Build Decode Matrix block 43, the compact singular value decomposition of the matrix product of the mode matrix and the transposed mixing matrix is calculated. This is an important aspect of the present invention, which can be performed in various manners. In one embodiment, the compact singular value decomposition S of the matrix product of the mode matrix $\tilde{\psi}$ and the transposed mixing matrix $G^T$ is calculated according to:

$$USV^H=\tilde{\psi}G^T$$

In an alternative embodiment, the compact singular value decomposition S of the matrix product of the mode matrix $\tilde{\psi}$ and the pseudo-inverse mixing matrix $G^+$ is calculated according to:

$$USV^H=\tilde{\psi}G^+$$

where $G^+$ is the pseudo-inverse of mixing matrix G.

In one embodiment, a diagonal matrix where $\hat{S}=\mathrm{diag}(\hat{S}_1, \ldots, \hat{S}_K)$ is created where the first diagonal element is the inverse diagonal element of S: $\hat{S}_1=1$, and the following diagonal elements $k$ are set to a value of one ($\hat{S}_k=1$) if $S_k \geq a\,S_1$, where $a$ is a threshold value, or are set to a value of zero ($\hat{S}_k=0$) if $S_k < a\,S_1$.

A suitable threshold value a was found to be around 0.06. Small deviations e.g. within a range of ±0.01 or a range of ±10% are acceptable. The decode matrix is then calculated as follows: $\hat{D}=V\hat{S}U^H$.

In the Smooth Decode Matrix block 44, the decode matrix is smoothed. Instead of applying smoothing coefficients to the HOA coefficients before decoding, as known in prior art, it can be combined directly with the decode matrix. This saves one processing step, or processing block respectively.

$$\mathcal{D} = \hat{D}\ \mathrm{diag}(\boldsymbol{h}) \tag{21}$$

In order to obtain good energy preserving properties also for decoders for HOA content with more coefficients than loudspeakers (i.e. $O_{3D}>L$), the applied smoothing coefficients $\boldsymbol{h}$ are selected depending on the HOA order N ($O_{3D}=(N+1)^2$):

For $L \geq O_{3D}$, $\boldsymbol{h}$ corresponds to max $r_E$ coefficients derived from the zeros of the Legendre polynomials of order N+1, as in [4].

For $L<O_{3D}$, the coefficients of $\boldsymbol{h}$ constructed from a Kaiser window as follows:

$$\mathcal{K} = \mathrm{KaiserWindow}(len, width) \tag{22}$$

with len=2N+1, width=2N, where $\mathcal{K}$ is a vector with 2N+1 real valued elements. The elements are created by the Kaiser window formula $$\mathcal{K}_i = \frac{I_0\left(\mathrm{width}\sqrt{1-\left(\frac{2i}{len-1}-1\right)^2}\right)}{I_0(\mathrm{width})} \tag{23}$$

where $I_0(\ )$ denotes the zero-order Modified Bessel function of first kind. The vector $\boldsymbol{h}$ is constructed from the elements of:

$$\boldsymbol{h} = c_f[\mathcal{K}_{N+1}, \mathcal{K}_{N+2}, \mathcal{K}_{N+2}, \mathcal{K}_{N+2}, \mathcal{K}_{N+3}, \mathcal{K}_{N+3}, \ldots, \mathcal{K}_{2N}]^T$$

where every element $\mathcal{K}_{N+1+n}$ gets 2n+1 repetitions for HOA order index n=0 . . . N, and $c_f$ is a constant scaling factor for keeping equal loudness between different HOA-order programs. That is, the used elements of the Kaiser window begin with the $(N+1)^{st}$ element, which is used only once, and continue with subsequent elements which are used repeatedly: the $(N+2)^{nd}$ element is used three times, etc.

In one embodiment, the smoothed decode matrix is scaled. In one embodiment, the scaling is performed in the Smooth Decode Matrix block 44, as shown in FIG. 4A. In a different embodiment, the scaling is performed as a separate step in a Scale Matrix block 45, as shown in FIG. 4B.

In one embodiment, the constant scaling factor is obtained from the decoding matrix. In particular, it can be obtained according to the so-called Frobenius norm of the decoding matrix:

$$c_f = \frac{1}{\sqrt{\sum_{l=1}^{L}\sum_{q=1}^{O_{3D}}|\tilde{d}_{l,q}|^2}},$$

where $\tilde{d}_{l,q}$ is a matrix element in line l and column q of the matrix $\tilde{D}$(after smoothing).

The normalized matrix is $D=c_f\tilde{D}$.

FIG. 5 shows, according to one aspect of the invention, a device for decoding an audio sound field representation for audio playback. It comprises a rendering processing unit 33 having a decode matrix calculating unit 140 for obtaining the decode matrix D, the decode matrix calculating unit 140 comprising means 1x for obtaining a number L of target speakers and means for obtaining positions $\mathfrak{D}_L$ of the speakers, means 1y for determining positions a spherical modeling grid $\mathfrak{D}_S$ and means 1z for obtaining a HOA order N, and first processing unit 141 for generating a mix matrix G from the positions of the spherical modeling grid $\mathfrak{D}_S$ and the positions of the speakers, second processing unit 142 for generating a mode matrix $\tilde{\Psi}$ from the spherical modeling grid $\mathfrak{D}_S$ and the HOA order N, third processing unit 143 for performing a compact singular value decomposition of the product of the mode matrix $\tilde{\psi}$ with the Hermitian transposed mix matrix G according to $USV^H=\tilde{\psi}G^H$, where U, V are derived from Unitary matrices and S is a diagonal matrix with singular value elements, calculating means 144 for calculating a first decode matrix $\hat{D}$ from the matrices U, V according to $\hat{D}=VU^H$, and a smoothing and scaling unit 145 for smoothing and scaling the first decode matrix $\hat{D}$ with smoothing coefficients $\boldsymbol{h}$, wherein the decode matrix D is obtained. In one embodiment, the smoothing and scaling unit 145 as a smoothing unit 1451 for smoothing the first decode matrix $\hat{D}$, wherein a smoothed decode matrix $\hat{D}$ is obtained, and a scaling unit 1452 for scaling smoothed decode matrix $\tilde{D}$, wherein the decode matrix D is obtained.

Figure 6:
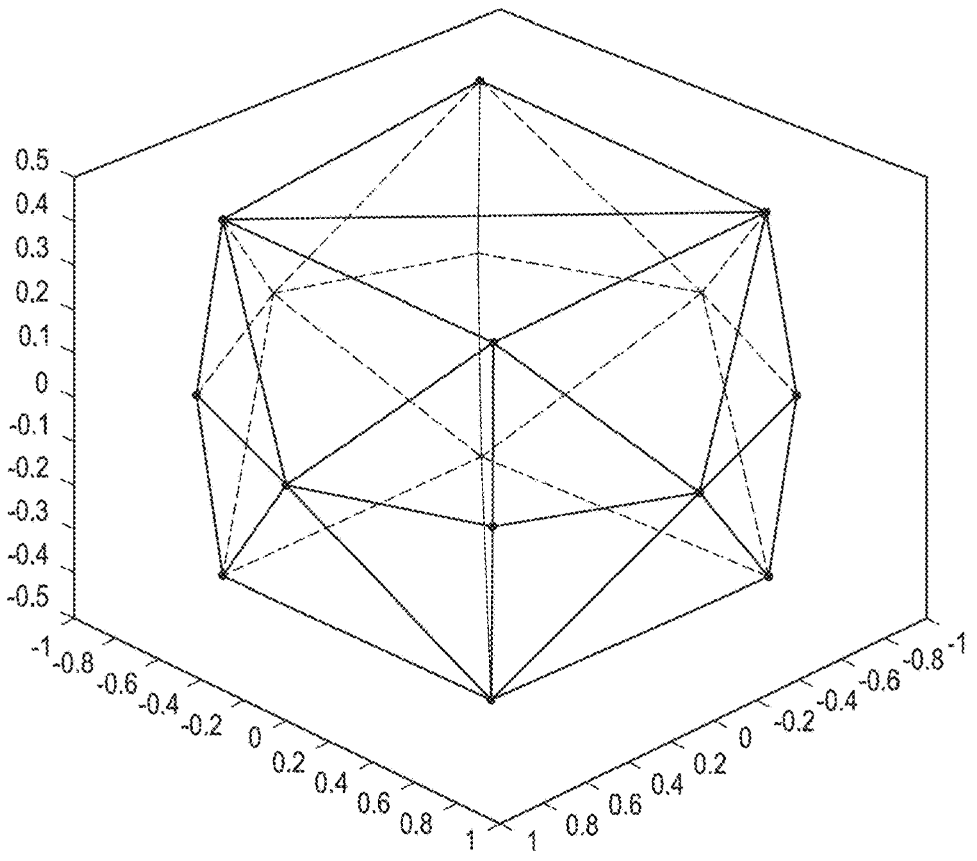
FIG. 6 illustrates an exemplary 16-speaker setup, where speakers are shown as connected nodes.
Figure 7:
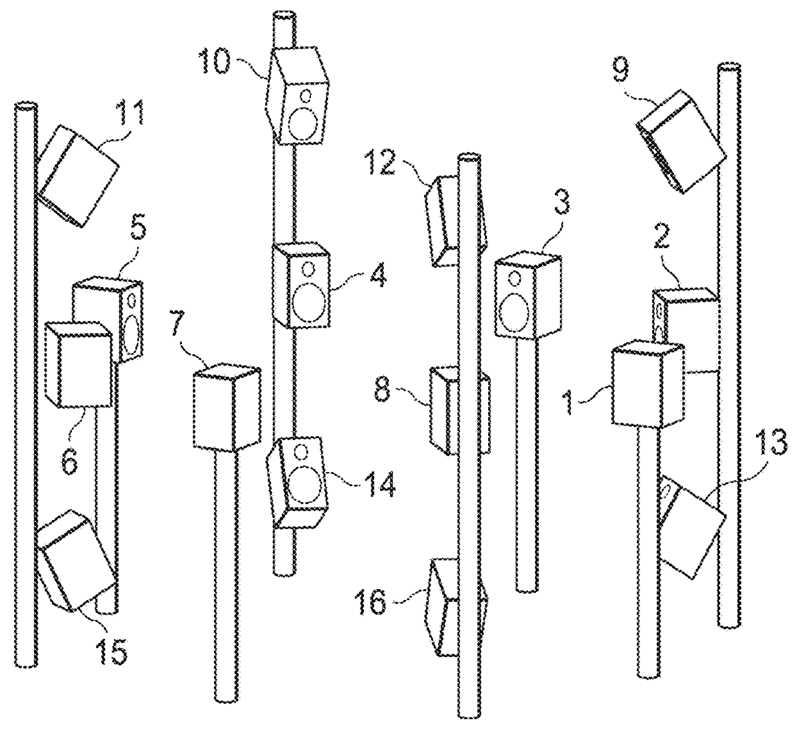
FIG. 7 illustrates the exemplary 16-speaker setup in natural view, where nodes are shown as speakers.

FIG. 6 shows speaker positions in an exemplary 16-speaker setup in a node schematic, where speakers are shown as connected nodes. Foreground connections are shown as solid lines, background connections as dashed lines. FIG. 7 shows the same speaker setup with 16 speakers in a foreshortening view.

Figure 8:
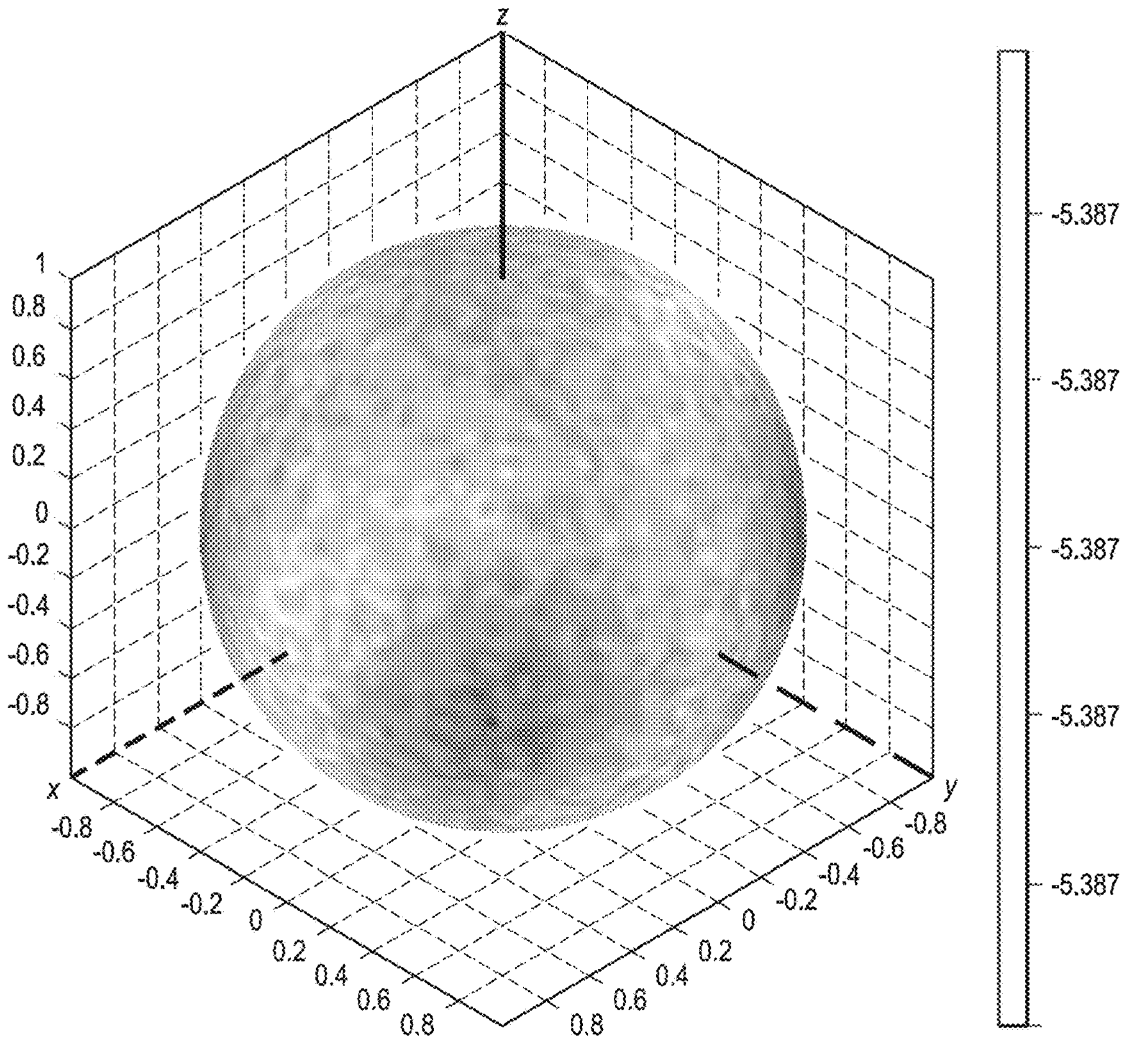
FIG. 8 illustrates an energy diagram showing the E/E ratio being constant for perfect energy preserving characteristics for a decode matrix obtained with prior art [14], with N=3.
Figure 9:
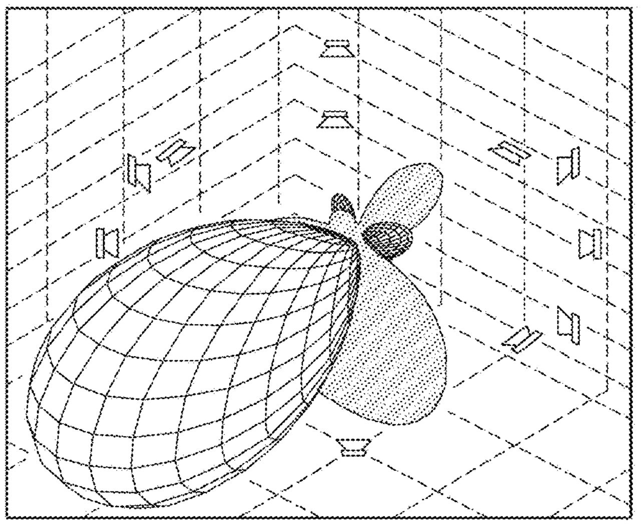
FIG. 9 illustrates a sound pressure diagram for a decode matrix designed according to prior art with N=3, where the panning beam of the center speaker has strong side lobes.

In the following, obtained example results with the speaker setup as in FIGS. 5 and 6 are described. The energy distribution of the sound signal, and in particular the ratio Ê/E is shown in dB on the 2 sphere (all test directions). As an example, for a loud speaker panning beam, the center speaker beam (speaker 7 in FIG. 6) is shown. For example, a decoder matrix that is designed as in [14], with N=3, produces a ratio Ê/E as shown in FIG. 8. It provides almost perfect energy preserving characteristics, since the ratio Ê/E is almost constant: differences between dark areas (corresponding to lower volumes) and light areas (corresponding to higher volumes) are less than 0.01 dB. However, as shown in FIG. 9, the corresponding panning beam of the center speaker has strong side lobes. This disturbs spatial perception, especially for off-center listeners.

Figure 11:
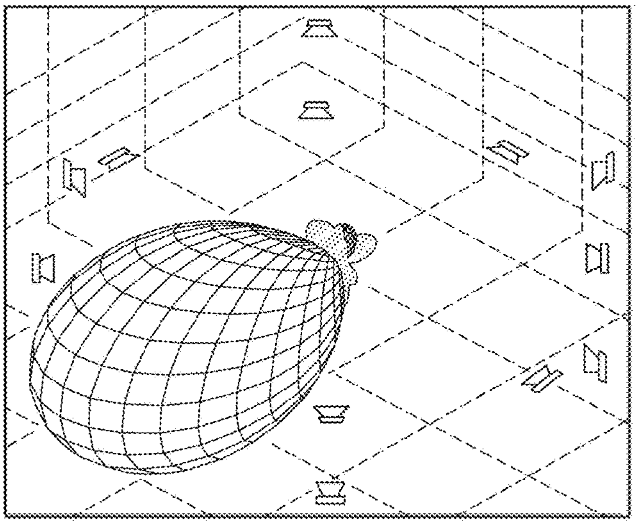
FIG. 11 illustrates a sound pressure diagram for a decode matrix designed according to prior art [2] with N=3, where the panning beam of the center speaker has small side lobes.

On the other hand, a decoder matrix that is designed as in [2], with N=3, produces a ratio Ê/E as shown in FIG. 9. In the scale used in FIG. 10, dark areas correspond to lower volumes down to −2 dB and light areas to higher volumes up to +2 dB. Thus, the ratio Ê/E shows fluctuations larger than 4 dB, which is disadvantageous because spatial pans e.g. from top to center speaker position with constant amplitude cannot be perceived with equal loudness. However, as shown in FIG. 11, the corresponding panning beam of the center speaker has very small side lobes, which is beneficial for off-center listening positions.

Figure 12:
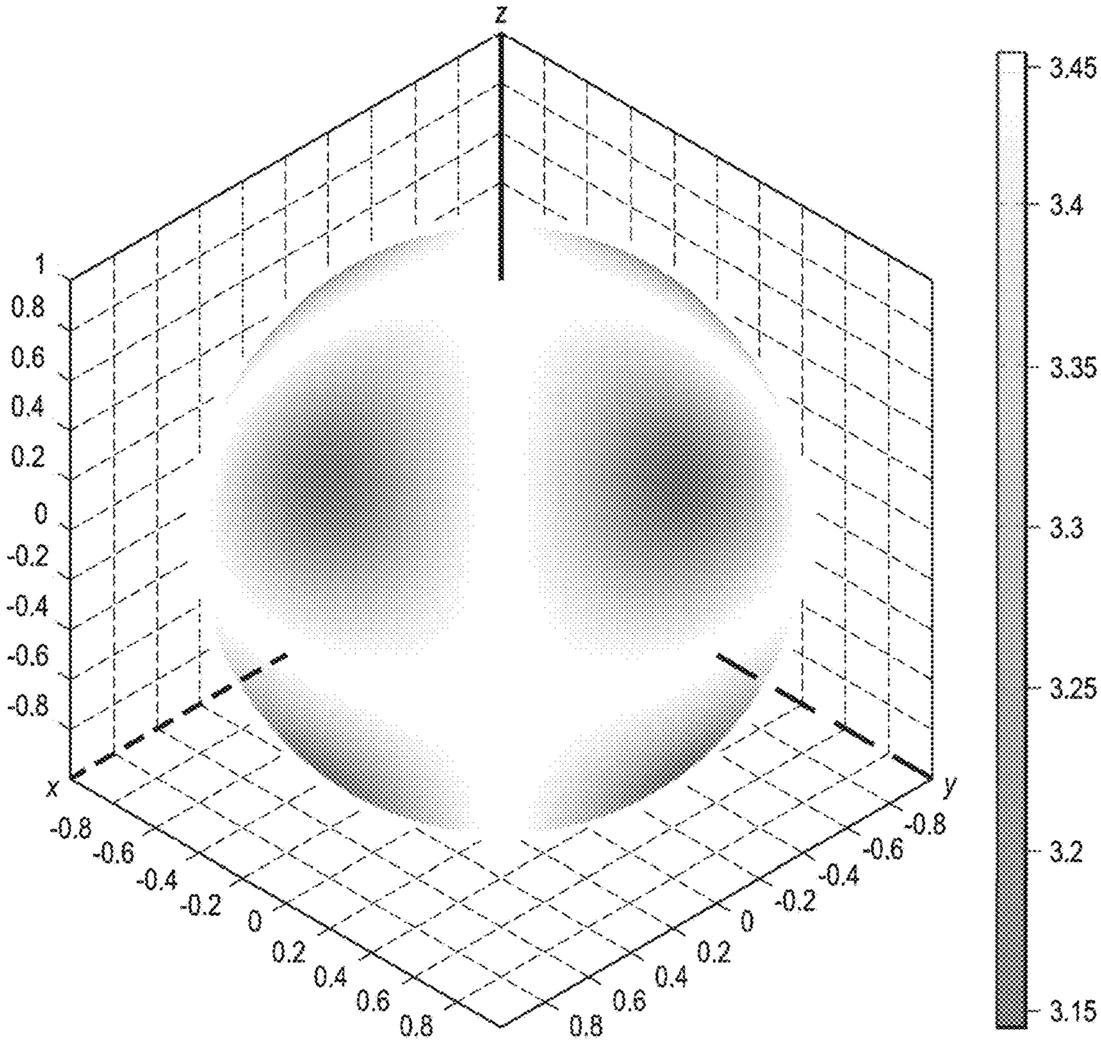
FIG. 12 illustrates an energy diagram showing the E/E ratio having fluctuations smaller than 1 dB as obtained by a method or apparatus according to the invention, where spatial pans with constant amplitude are perceived with equal loudness.
Figure 13:
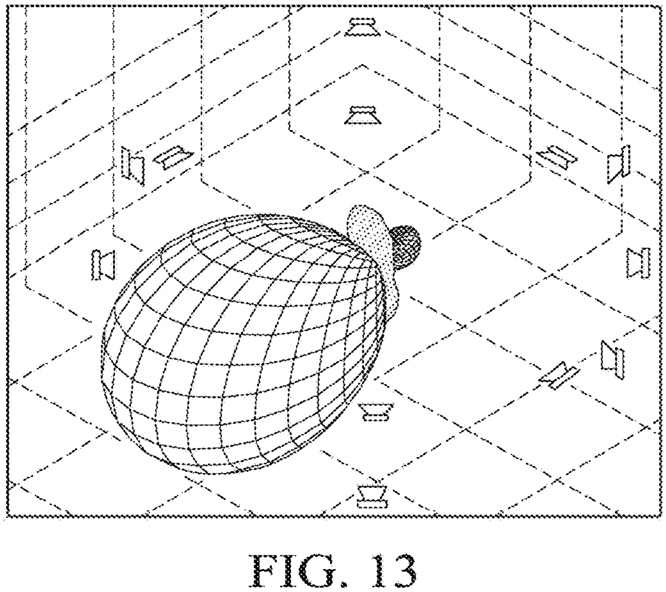
FIG. 13 illustrates a sound pressure diagram for a decode matrix designed with the method according to the invention, where the center speaker has a panning beam with small side lobes.

FIG. 12 shows the energy distribution of a sound signal that is obtained with a decoder matrix according to the present invention, exemplarily for N=3 for easy comparison. The scale (shown on the right-hand side of FIG. 12) of the ratio Ê/E ranges from 3.15-3.45 dB. Thus, fluctuations in the ratio are smaller than 0.31 dB, and the energy distribution in the sound field is very even. Consequently, any spatial pans with constant amplitude are perceived with equal loudness. The panning beam of the center speaker has very small side lobes, as shown in FIG. 13. This is beneficial for off center listening positions, where side lobes may be audible and thus would be disturbing. Thus, the present invention provides combined advantages achievable with the prior art in and [2], without suffering from their respective disadvantages.

It is noted that whenever a speaker is mentioned herein, a sound emitting device such as a loudspeaker is meant.

The flowchart and/or block diagrams in the figures illustrate the configuration, operation and functionality of possible implementations of systems, methods and computer program products according to various embodiments of the present invention. In this regard, each block in the flowchart or block diagrams may represent a module, segment, or portion of code, which comprises one or more executable instructions for implementing the specified logical functions.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

Further, as will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized. A computer readable storage medium as used herein is considered a non-transitory storage medium given the inherent capability to store the information therein as well as the inherent capability to provide retrieval of the information therefrom.

Also, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable storage media and so executed by a computer or processor, whether or not such computer or processor is explicitly shown.

CITED REFERENCES

[1]T. D. Abhayapala. Generalized framework for spherical microphone arrays: Spatial and frequency decomposition. In Proc. IEEE International Conference on Acoustics, Speech, and Signal Processing (ICASSP), (accepted) Vol. X, pp., April 2008, Las Vegas, USA.

[2] Johann-Markus Batke, Florian Keiler, and Johannes Boehm. Method and device for decoding an audio soundfield representation for audio playback. International Patent Application WO2011/117399 (PD100011).

[3] Jerome Daniel, Rozenn Nicol, and Sébastien Moreau. Further investigations of high order ambisonics and wavefield synthesis for holophonic sound imaging. In *AES Convention Paper* 5788 *Presented at the* 114*th Convention*, March 2003. Paper 4795 presented at the 114th Convention.

[4] Jérôme Daniel. Représentation de champs acoustiques, application a la transmission et a la reproduction de scenes sonores complexes dans un contexte multimedia. PhD thesis, Universite Paris 6, 2001.

[5] James R. Driscoll and Dennis M. Healy Jr. Computing Fourier transforms and convolutions on the 2-sphere. *Advances in Applied Mathematics,* 15:202-250, 1994.

[6] Jörg Fliege. Integration nodes for the sphere. http://www.personal.soton.ac.uk/jf1w07/nodes/nodes.html, Online, accessed 2012-06-01.

[7] Jörg Fliege and Ulrike Maier. A two-stage approach for computing cubature formulae for the sphere. Technical Report, Fachbereich Mathematik, Universitat Dortmund, 1999.

[8] R. H. Hardin and N. J. A. Sloane. Webpage: Spherical designs, spherical t-designs. http://www2.research.att.com/~njas/sphdesigns/.

[9] R. H. Hardin and N. J. A. Sloane. Mclaren's improved snub cube and other new spherical designs in three dimensions. *Discrete and Computational Geometry,* 15:429-441, 1996.

[10] M. A. Poletti. Three-dimensional surround sound systems based on spherical harmonics. J. Audio Eng. Soc., 53(11):1004-1025, November 2005.

[11] Ville Pulkki. *Spatial Sound Generation and Perception by Amplitude Panning Techniques*. PhD thesis, Helsinki University of Technology, 2001.

[12] Boaz Rafaely. Plane-wave decomposition of the sound field on a sphere by spherical convolution. *J. Acoust. Soc. Am.,* 4(116):2149-2157, October 2004.

[13] Earl G. Williams. *Fourier Acoustics*, volume 93 of Applied Mathematical Sciences. Academic Press, 1999.

[14] F. Zotter, H. Pomberger, and M. Noisternig. Energy-preserving ambisonic decoding. *Acta Acustica united with Acustica,* 98(1):37-47, January/February 2012.

The invention claimed is:

1. A method for decoding a Higher-Order Ambisonics (HOA) representation of a sound or sound field, the method comprising:

receiving a smoothed decode matrix $\tilde{D}$ that is based on a mix matrix G and a mode matrix $\tilde{\psi}$, wherein the mix matrix G was determined based on L speakers and positions of a spherical modelling grid, wherein the mode matrix $\tilde{\Psi}$ was determined based on the spherical modelling grid and a HOA order N, wherein the smoothed decode matrix $\tilde{D}$ was determined based on smoothing of a first decode matrix $\hat{D}$ with smoothing coefficients, wherein the first decode matrix $\hat{D}$ was determined based on $\hat{D}=V\hat{S}U^H$, wherein U,V are based on Unitary matrices, wherein a compact singular value decomposition of a product of the mode matrix $\tilde{\Psi}$ with a transposed mix matrix is determined based on $USV^H=\tilde{\Psi}G^T$ wherein S is based on a diagonal matrix with singular value elements, and wherein $\hat{S}$ is a truncated compact singular value decomposition matrix that is either an identity matrix or a modified diagonal matrix, the modified diagonal matrix being determined based on the diagonal matrix with singular value elements by replacing a singular value element that is larger or equal than a threshold by ones, and replacing a singular value element that is smaller than the threshold by zeros; and rendering coefficients of the HOA representation from a time domain to a spatial domain based a rendering matrix D, wherein the rendering matrix D is based on a Frobenius norm of on the smoothed decode matrix $\tilde{D}$.

2. A non-transitory computer readable medium having stored thereon executable instructions to cause a computer to perform the method of claim 1.

3. An apparatus for decoding a Higher-Order Ambisonics (HOA) representation of a sound or sound field for audio playback, comprising:

a decoder configured to decode coefficients of the HOA sound field representation, the decoder including:

a receiver configured to receive a smoothed decode matrix $\tilde{D}$ that is based on a mix matrix G and a mode matrix $\tilde{\Psi}$, wherein the mix matrix G was determined based on L speakers and positions of a spherical modelling grid, wherein the mode matrix $\tilde{\Psi}$ was determined based on the spherical modelling grid and a HOA order N, wherein the smoothed decode matrix $\tilde{D}$ is determined based on smoothing a first decode matrix $\hat{D}$ with smoothing coefficients, wherein the first decode matrix $\hat{D}$ is determined based on $\hat{D}=V\hat{S}U^H$, wherein U,V are based on Unitary matrices, and wherein a compact singular value decomposition of a product of the mode matrix $\tilde{\Psi}$ with a transposed mix matrix is determined based on $USV^H=\tilde{\Psi}G^T$, wherein S was determined based on a diagonal matrix with singular value elements, wherein $\hat{S}$ is a truncated compact singular value decomposition matrix that is either an identity matrix or a modified diagonal matrix, the modified diagonal matrix being determined based on the diagonal matrix with singular value elements by replacing a singular value element that is larger or equal than a threshold by ones, and replacing a singular value element that is smaller than the threshold by zeros; and a renderer configured for rendering coefficients of the HOA representation from a time domain to a spatial domain based a rendering matrix D, wherein the rendering matrix D is based on a Frobenius norm of on the smoothed decode matrix $\tilde{D}$.

* * * * *